(12) United States Patent
Wright et al.

(10) Patent No.: US 11,878,605 B1
(45) Date of Patent: Jan. 23, 2024

(54) BATTERY MODULES WITH INTEGRATED MODULE CONVERTERS AND METHODS OF OPERATING THEREOF

(71) Applicant: DIMAAG-AI, Inc., Fremont, CA (US)

(72) Inventors: Ian Wright, Woodside, CA (US); George Fellingham, Gilroy, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/319,596

(22) Filed: May 18, 2023

Related U.S. Application Data (60) Provisional application No. 63/502,693, filed on May 17, 2023.

(51) Int. Cl.
*B60L 58/21* (2019.01)
*B60L 58/22* (2019.01)
*B60L 50/64* (2019.01)
*H01M 10/48* (2006.01)

(52) U.S. Cl.
CPC ............... *B60L 58/21* (2019.02); *B60L 50/64* (2019.02); *B60L 58/22* (2019.02); *H01M 10/482* (2013.01); *B60L 2240/547* (2013.01); *H01M 2220/20* (2013.01)

(58) Field of Classification Search
None
See application file for complete search history.

(56) References Cited

U.S. PATENT DOCUMENTS

| 8,307,930 | B2 | 11/2012 | Sailor et al. | |
|---|---|---|---|---|
| 9,221,345 | B2 * | 12/2015 | Bito | B60L 58/21 |
| 2014/0183939 | A1 * | 7/2014 | Jiang | B60L 1/08 |
| | | | | 429/231.1 |

(Continued)

OTHER PUBLICATIONS

Balachandran, Arvind; "Battery-Integrated Modular Multilevel Converter Topologies for Automotive Applications", Linköping Studies in Science and Technology, Licentiate Thesis No. 1952; 2023; Retrieved from the Internet: https://core.ac.uk/download/pdf/288626776.pdf.

(Continued)

*Primary Examiner* — Adam D Tissot
*Assistant Examiner* — Garrett F Evans
(74) *Attorney, Agent, or Firm* — Polygon IP, LLP (57) ABSTRACT

Described herein are battery modules comprising integrated module converters, electric-vehicle battery systems comprising such modules, and methods of operating thereof. An electric-vehicle battery system comprises a high-voltage battery pack and high-voltage contactors that controllably isolate the pack's high-voltage area from other areas in the vehicle. The pack comprises multiple battery modules with battery cells and a primary module converter constantly connected to these cells. Each module has a lower voltage than the entire pack. The power output from the primary module converters is used to operate a battery controller and to close/activate the contactors in response to the switch position (e.g., an ignition switch). The primary module converters can be either constantly activated or controllably activated in response to the switch moving into an activated position. For example, a secondary module converter, with a lower power rating, can be used for this primary module converter activation.

20 Claims, 7 Drawing Sheets

(56) References Cited

U.S. PATENT DOCUMENTS

2016/0311328 A1* 10/2016 Kim .................. B60L 50/50
2017/0036545 A1* 2/2017 Lopez De Arroyabe ...................
                                                        H01M 10/46
2020/0014306 A1* 1/2020 Riar .................. H02M 3/285

OTHER PUBLICATIONS

Diaz-Gonzalez, Francisco et al.; "A comparison of power conversion systems for modular battery-based energy storage systems", IEEE Access, vol. 4, 2016; Retrieved from the Internet: https://liu.diva-portal.org/smash/get/diva2:1735001/FULLTEXT02.pdf.

* cited by examiner

BATTERY MODULES WITH INTEGRATED MODULE CONVERTERS AND METHODS OF OPERATING THEREOF

CROSS-REFERENCE TO RELATED APPLICATIONS

This application claims the benefit under 35 U.S.C. § 119(e) of U.S. Provisional Patent Application 63/502,693, filed on 2023 May 17, which is incorporated herein by reference in its entirety for all purposes.

BACKGROUND

Conventional electric vehicles use high-voltage battery packs, formed by interconnecting multiple battery modules. Specifically, a high-voltage battery pack is connected to a high-voltage direct-current (DC) bus by high-voltage contactors, which controllably disconnect the high-voltage DC bus from the battery pack when the vehicle is not in use. It should be noted that the battery pack has internal high-voltage buses, which can be referred to as battery-pack buses to differentiate from the high-voltage DC bus, which is used in a vehicle outside of the battery pack. Unlike the high-voltage DC bus, the internal high-voltage buses are always at their respective high voltage (since the fabrication of the battery pack). The high-voltage contactors are closed/activated when power is needed from the battery pack (e.g., the vehicle is in operation). On the other hand, these contactors are open/deactivated when power is not needed from the battery pack (e.g., the vehicle is shut down). The deactivation of the high-voltage contactors isolates the high-voltage battery pack from the high-voltage DC bus, which allows handing (e.g., while servicing the electric vehicle) the high-voltage DC bus and various vehicle components connected to the high-voltage DC bus (and provided outside of the battery pack), e.g., vehicle inverter, converter, and the like.

Furthermore, electric vehicles have a low-voltage bus (e.g., operating at about 12V) to power various control electronics, lights, and various other low-power components. The power for this low-voltage bus comes from a vehicle DC/DC converter, which converts the high voltage (e.g., 350-800V) in the high-voltage DC bus to the low voltage (e.g., 12V) in the low-voltage bus. It should be noted that the power from the low-voltage bus can be also used to close/activate the high-voltage contactors and keep these contactors in the closed/activated state.

However, when the vehicle is shut down, the high-voltage contactors are deactivated, and the high-voltage DC bus does not receive any power from the battery pack. Therefore, the DC/DC converter (connected to the high-voltage DC bus) cannot supply any power to the low-voltage bus, e.g., to power the control electronics and close/activate the high-voltage contactors. For that, a separate low-voltage battery (e.g., a conventional 12V battery) is used to power the low-voltage bus. Specifically, the low-voltage battery is used to power any components connected to the low-voltage bus (e.g., controllers and high-voltage contactors) before the high-voltage contactors are closed/activated. In other words, this low-voltage battery provides the power needed to close/activate these high-voltage contactors. Once the high-voltage contactors are closed/activated, the low-voltage bus is also powered by the DC/DC converter, and the power from the low-voltage battery is no longer needed. In fact, the power from the DC/DC converter can be used to recharge the low-voltage battery during this battery-pack-connected state.

However, when a low-voltage battery (e.g., a conventional 12V battery) fails or is depleted below the operational threshold while the high-voltage contactors are open/deactivated, the electric vehicle cannot be started even though there is ample energy stored in the high-voltage battery pack. Specifically, there is no power available to the low-voltage bus to power the control electronics and close (activate) the high-voltage contactors.

What is needed are new electric-vehicle battery systems in which battery modules utilize integrated module converters thereby (eliminating the need for a low-voltage battery) and methods of operating vehicles equipped with such battery systems.

SUMMARY

Described herein are battery modules comprising integrated module converters, electric-vehicle battery systems comprising such modules, and methods of operating thereof. An electric-vehicle battery system comprises a high-voltage battery pack and high-voltage contactors that controllably isolate the pack's high-voltage area from other areas in the vehicle. The pack comprises multiple battery modules with battery cells and a primary module converter constantly connected to these cells. Each module has a lower voltage than the entire pack. The power output from the primary module converters is used to operate a battery controller and to close/activate the contactors in response to the switch position (e.g., an ignition switch). The primary module converters can be either constantly activated or controllably activated in response to the switch moving into an activated position. For example, a secondary module converter, with a lower power rating, can be used for this primary module converter activation.

In some examples, an electric-vehicle battery system comprises a high-voltage battery pack comprising bus bars and multiple battery modules interconnected by these bus bars. Each of the multiple battery modules comprises battery cells and a primary module converter, constantly connected to the battery cells. The electric-vehicle battery system also comprises a main switch (e.g., an ignition switch of the vehicle) connected to the primary module converter of each battery module and configured to switch between an activated position and a deactivated position. The electric-vehicle battery system comprises high-voltage contactors connected to the bus bars of the high-voltage battery pack. Furthermore, the electric-vehicle battery system comprises a battery controller connected to the high-voltage contactors and also connected to the primary module converter of each battery module. The battery controller is configured (a) to connect (activate/close) the high-voltage contactors when the main switch is in the activated position and power is received at the battery controller from the primary module, and (b) to disconnect (deactivated/open) the high-voltage contactors when the main switch is in the deactivated position and the power is not received at the battery controller from the primary module converter.

In some examples, the main switch is further connected to the battery controller and is configured to control the current flow between the primary module converter of each of the multiple battery modules and the battery controller. In these examples, the primary module converter of each of the multiple battery modules can be constantly activated and powered by the battery cells of a corresponding one of the multiple battery modules. It should be noted that the battery controller can be activated by the power supplied from the primary module converters through the main switch. Once activated, the power can be supplied directly from the primary module converters to the battery controller can.

In some examples, each of the multiple battery modules further comprises a secondary module converter, which is constantly connected to the battery cells and is further connected to the main switch. The main switch is configured to control the current flow current between the primary module converter and the secondary module converter of each of the multiple battery modules (e.g., used to control the activation of the primary module converter using power from the secondary module converter). The primary module converter of each of the multiple battery modules can be constantly connected to the battery controller (and can be controllably activated/deactivated).

In these examples, the secondary module converter of each of the multiple battery modules is constantly activated and powered by the battery cells of a corresponding one of the multiple battery modules. The primary module converter of each of the multiple battery modules is selectively activated and powered by the battery cells of a corresponding one of the multiple battery modules when the main switch is in the activated position. Furthermore, the primary module converter of each of the multiple battery modules is selectively deactivated and not powered by the battery cells of the corresponding one of the multiple battery modules when the main switch is in the deactivated position (thereby reducing the module charge drain). In some examples, each of the multiple battery modules further comprises a module switch configured to: (a) selectively activate and power the primary module converter the main switch is in the activated position, and (b) selectively deactivate and depower the primary module converter the main switch is in the deactivated position. For example, the module switch of each of the multiple battery modules is an optoisolator.

In some examples, the secondary module converter has a power rating less than that of the primary module converter. For example, the secondary module converter has a power rating more than 5 times, more than 10 times, or even more than 20 times less than that of the primary module converter. The secondary module converter has a power rating sufficient for the activation of the primary module converter. On the other hand, the primary module converter has a power rating sufficient for operating the battery controller and the high-voltage contactors.

In some examples, the secondary module converter has a conversion ratio equal to that of the primary module converter. In these examples, the secondary module converter can be converted in parallel with the primary module converter. For example, the output operating voltage of the primary module converter can be substantially similar to the output operating voltage of the secondary module converter. Alternatively, the secondary module converter has a conversion ratio different than that of the primary module converter. In some examples, the secondary module converter of each of the multiple battery modules is connected in parallel to the secondary module converter of any other one of the multiple battery modules, e.g., to combine the power for the activation of the primary module converters. In some examples, the high-voltage battery pack has an operating voltage of at least 200V. Each of the multiple battery modules has an operating voltage of less than 100V. The primary module converter of each of the multiple battery modules has an output voltage of 10-15V.

In some examples, the primary module converter of each of the multiple battery modules is connected in parallel to the primary module converter of any other one of the multiple battery modules. For example, the power output of multiple primary module converters can be combined to power the battery controller and the high-voltage contactors.

In some examples, the electric-vehicle battery system further comprises a low-voltage connector connected in parallel to the primary module converter of all of the multiple battery modules. For example, the low-voltage connector can be connected to the primary module converter of all of the multiple battery modules by the main switch configured to control a current flow between the low-voltage connector and the primary module converter of all of the multiple battery modules. In some examples, the battery modules are interconnected in series within the high-voltage battery pack.

Also provided is an electric vehicle comprising a high-voltage battery pack, a main switch, high-voltage contactors, a battery controller, a vehicle converter, an inverter, and an electric motor. The high-voltage battery pack comprises bus bars and multiple battery modules interconnected by the bus bars. Each of the multiple battery modules comprises battery cells and a primary module converter constantly connected to the battery cells. The primary module converter separates a constant high-voltage area of the high-voltage battery pack from a low-voltage area of the electric vehicle. The main switch is connected to the primary module converter of each of the multiple battery modules and configured to switch between an activated position and a deactivated position. The main switch is a part of the low-voltage area. The high-voltage contactors are connected to the bus bars of the high-voltage battery pack and configured to separate or interconnect the constant high-voltage area of the high-voltage battery pack and a controllably isolated high-voltage area of the electric vehicle. The battery controller is connected to the high-voltage contactors and also connected to the primary module converter of each of the multiple battery modules and configured (a) to connect the high-voltage contactors when the main switch is in the activated position and power is received at the battery controller from the primary module converter of each of the multiple battery modules, and (b) to disconnect the high-voltage contactors when the main switch is in the deactivated position and the power is not received at the battery controller from the primary module converter of each of the multiple battery modules. The vehicle converter is connected to the high-voltage contactors by a high-voltage DC bus and separates the controllably isolated high-voltage area from the low-voltage area. The inverter is connected to the high-voltage contactors by a high-voltage DC bus. The electric motor is connected to the inverter by a high-voltage AC bus, wherein the inverter and the electric motor are parts of the controllably isolated high-voltage area.

Also provided is a method of operating an electric-vehicle battery system comprising a high-voltage battery pack, a main switch, high-voltage contactors, and a battery controller. The method comprises putting the main switch into an activated position thereby (a) powering the battery controller from a primary module converter of each of multiple battery modules in the high-voltage battery pack and (b) connecting the high-voltage contactors using the battery controller. The battery controller redistributes a portion of power, received from the primary module converter of each of the multiple battery modules to the high-voltage contactors for connecting the high-voltage contactors. The method also comprises putting the main switch into a deactivated position thereby (a) disconnecting the battery controller from the primary module converter of each of the multiple battery modules in the high-voltage battery pack and (b) disconnecting the high-voltage contactors using the battery controller by cutting power from the battery controller to the high-voltage contactors.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

Figure 1A:
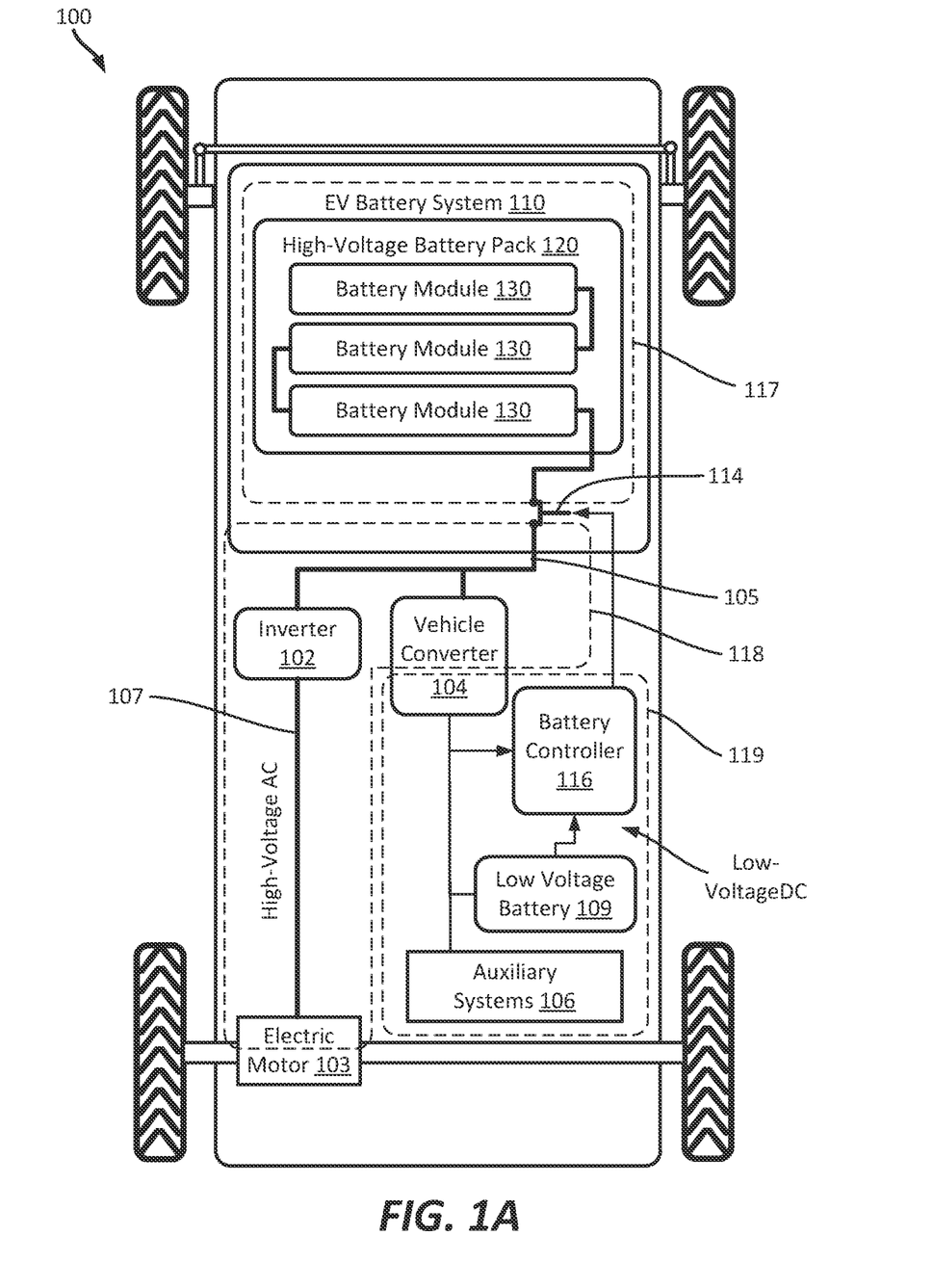
FIG. 1A is a schematic representation of one example of an electric vehicle comprising an electric-vehicle battery system and a low-voltage battery for powering at least high-voltage contactors of the battery system during the activations of these contactors.

As noted above, conventional electric vehicles used both high-voltage battery packs and low-voltage batteries. Specifically, FIG. 1A is a schematic illustration of electric vehicle 100 comprising electric-vehicle battery system 110 with high-voltage battery pack 120 and low-voltage battery 109. Electric-vehicle battery system 110 also comprises high-voltage contactors 114, used to connect/disconnect high-voltage battery pack 120 and high-voltage DC bus 105, extending outside of electric-vehicle battery system 110 and connected to other components of electric vehicle 100. In other words, high-voltage contactors 114 conceptually separate constant high-voltage area 117 and controllably isolated high-voltage area 118. When high-voltage contactors 114 are open/inactivated, the two areas are separated and isolated from each other. On the other hand, when high-voltage contactors 114 are closed/activated, the two areas are interconnected and various components in controllably isolated high-voltage area 118 can draw power from or supply power to electric-vehicle battery system 110. Some of these components (in controllably isolated high-voltage area 118) include, but are not limited to, inverter 102, electric motor 103, and vehicle converter 104. Specifically, inverter 102 is configured for inverting the power between alternating (AC) and direct current (DC) and, as shown in FIG. 1A, interconnects high-voltage DC bus 105 and high-voltage AC bus 107, which may be connected to electric motor 103. Vehicle converter 104 separates controllably isolated high-voltage area 118 (e.g., operating at 350-800V) from low-voltage area 119 (e.g., operating at 10-15V). Low-voltage area 119 comprises auxiliary systems 106 (e.g., lights), low-voltage battery 109, and battery controller 116 (which, in some examples, may be integrated into electric-vehicle battery system 110). When high-voltage contactors 114 are open/inactivated and no power is available from high-voltage DC bus 105 and from vehicle converter 104, low-voltage battery 109 is used to power battery controller 116 and close/activate high-voltage contactors 114. As noted above, when low-voltage battery 109 fails or is depleted below the operational threshold, electric vehicle 100 cannot be started even though high-voltage battery pack 120 can have ample energy stored. In this situation and configuration of electric vehicle 100, there are no power sources available to close/activate high-voltage contactors 114 (before the power can be drawn from high-voltage battery pack 120 through vehicle converter 104).

Figure 1B:
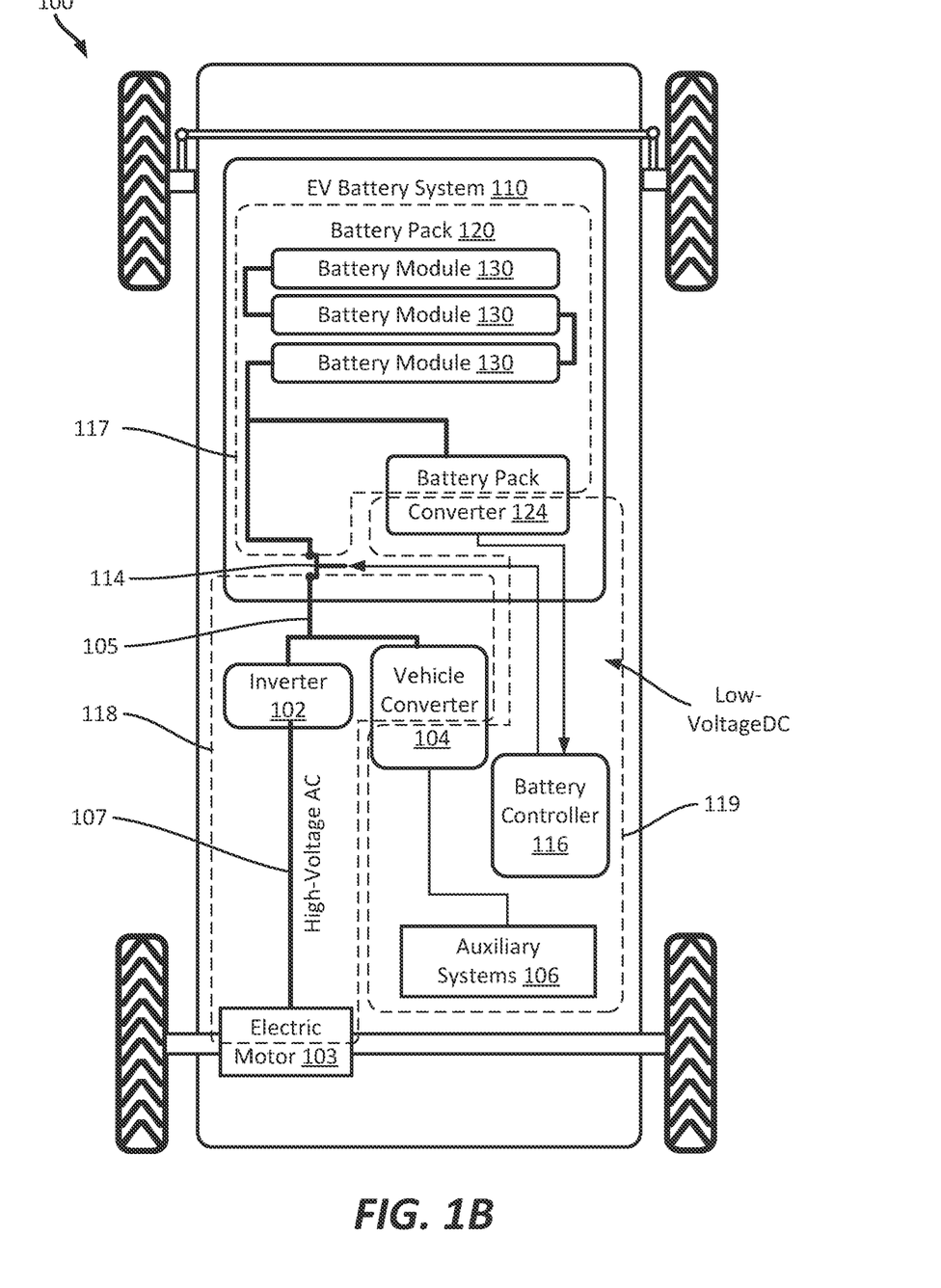
FIG. 1B is a schematic representation of another example of an electric vehicle comprising an electric-vehicle battery system with a battery pack and a pack converter for powering at least high-voltage contactors of the battery system during the activations of these contactors.

FIG. 1B illustrates one example of electric vehicle 100, in which the need for a low-voltage battery is eliminated by integrating battery-pack converter 124 into high-voltage battery pack 120 or, more generally, into electric-vehicle battery system 110. In this example, battery-pack converter 124 separates constant high-voltage area 117 and low-voltage area 119. Battery-pack converter 124 is always activated and can provide low-voltage power at all times, irrespective of the activation of high-voltage contactors 114. Battery controller 116 is connected to battery-pack converter 124 and can be used to close/actuate high-voltage contactors 114 at any time using the power from battery-pack converter 124. The remaining components in this example are the same as in the example of FIG. 1A, which is described above.

However, battery-pack converter 124 being constantly activated presents various challenges. For example, installation/service of battery-pack converter 124 can be difficult due to its direct connection to high-voltage battery-pack buses, which are always powered due to their permanent connections to battery modules 130. Furthermore, battery-pack converter 124 requires a significant conversion ratio (e.g., from 350-800V to 12V) which can require complex hardware and can result in significant power losses (in comparison with converters used for lower conversion ratios).

Figure 1C:
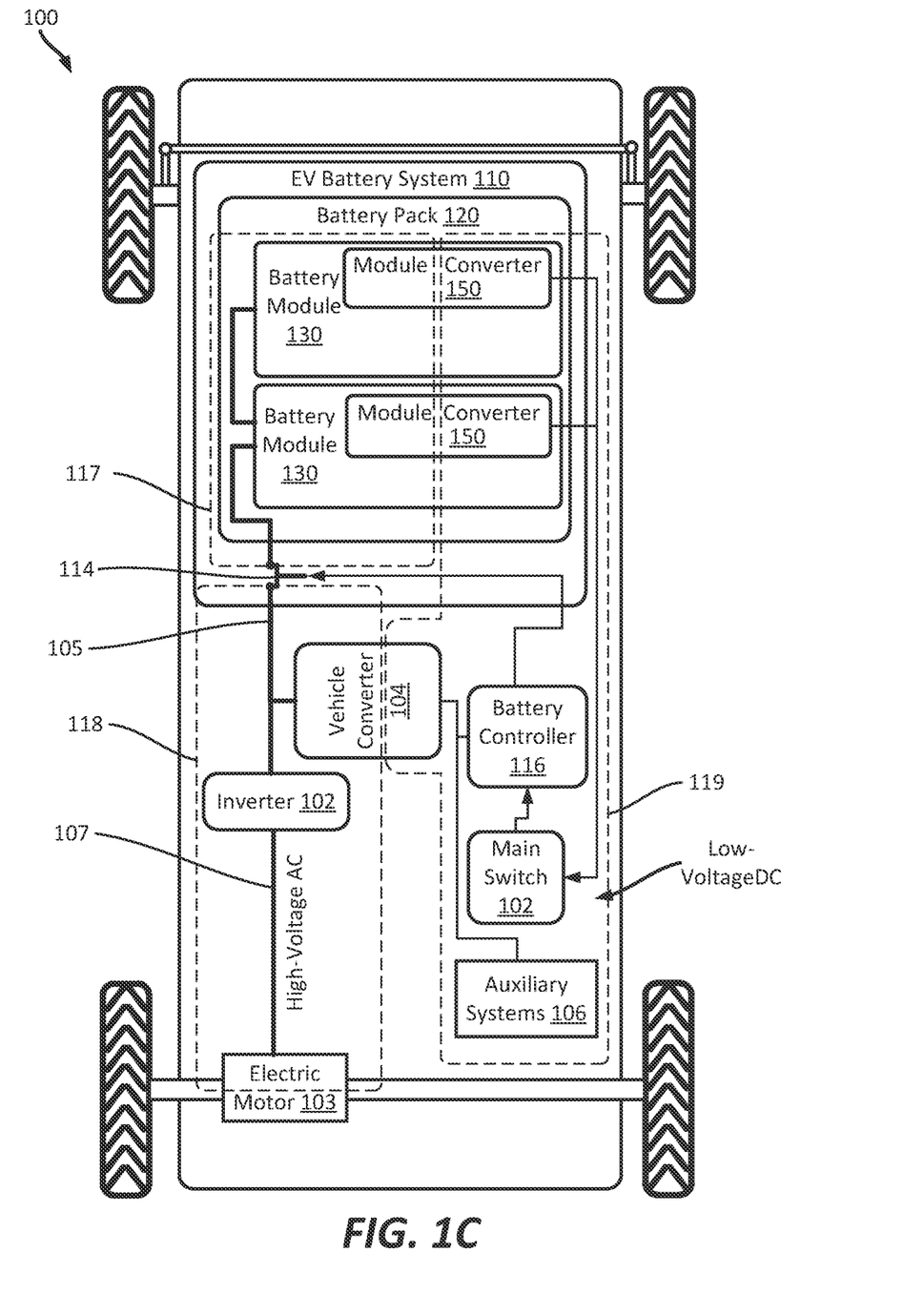
FIG. 1C is a schematic representation of yet another example of an electric vehicle comprising an electric-vehicle battery system comprising multiple battery modules, each equipped with at least one module converter, used for powering at least high-voltage contactors of the battery system during the activations of these contactors.

FIG. 1C illustrates another example of electric vehicle 100, in which each battery module 130 is equipped with primary module converter 150. Primary module converter 150 can be the only converter in each battery module 130, e.g., as further described below with reference to FIG. 2A. Alternatively, each battery module 130 has an additional converter (secondary module converter 170), e.g., as further described below with reference to FIGS. 2B and 3.

Primary module converters 150 separate constant high-voltage area 117 from low-voltage area 119, which at least partially extends into each battery module 130. It should be noted that this high-low voltage separation provided by primary module converters 150 is permanent/constant and allows various operations (e.g., assembly, maintenance) of at least a portion of high-voltage battery pack 120 (defined by low-voltage area 119) without being exposed to high-voltages. For example, various low-voltage components of electric vehicle 100 can be directly connected to primary module converters 150 as further described below. Furthermore, primary module converters 150 (from multiple battery modules 130) collectively provide power to battery controller 116 (e.g., through main switch 112) and, in some examples, to additional vehicle systems, e.g., auxiliary systems 106. This power is available at all times regardless of the activation state of high-voltage contactors 114. Specifically, the power to battery controller 116 can be used to activate/close high-voltage contactors 114. Once high-voltage contactors 114 are activated, high-voltage battery pack 120 provides power to high-voltage DC bus 105, which can be used for powering various devices within controllably isolated high-voltage area 118 and connected to high-voltage DC bus 105. For example, vehicle converter 104 can be connected to high-voltage DC bus 105 and is used to provide power to low-voltage area 119 (e.g., battery controller 116) when high-voltage contactors 114 are activated.

The remaining components of this example are the same as in the examples of FIGS. 1A and 1B. Specifically, vehicle converter 104 separates controllably isolated high-voltage area 118 and low-voltage area 119. Vehicle converter 104 can be used to provide power to various components in low-voltage area 119, once the power is available in controllably isolated high-voltage area 118 (i.e., once high-voltage contactors 114 are activated/closed). Until this point (i.e., until high-voltage contactors 114 are activated/closed), the power to one or more components in low-voltage area 119 (e.g., battery controller 116) is provided by primary module converters 150.

It should be noted that the operating voltage of battery modules 130 can be substantially lower than that of high-voltage battery pack 120 (e.g., 20-50V vs. 350-800V). In fact, high-voltage battery pack 120 is typically formed by interconnecting multiple battery modules 130 in series thereby boosting the voltage of high-voltage battery pack 120 (relative to the voltage in each battery module 130). As such, integration and servicing of primary module converters 150 can be substantially safer and less complicated than that of battery-pack converter 124 (described above with reference to FIG. 1B). Furthermore, the conversion ratio (i.e., the voltage ratio) of primary module converters 150 can be substantially less than that of battery-pack converters 124, resulting in the more efficient operation of primary module converters 150. Finally, the output of multiple primary module converters 150 can be collectively used to power battery controller 116 (e.g., by interconnecting these outputs in parallel). Even if one or more module converters fail, the remaining module converters can be sufficient to power battery controller 116, in some examples thereby improving the operating robustness.

Overall, high-voltage battery pack 120 comprises several battery modules 130, interconnected in series and each operating at a lower voltage (e.g., 20-50V). Each battery module 130 is equipped with primary module converter 150, which is a low-power converter (e.g., between 2-50 W) with a low conversion ratio (e.g., less than 10 such as from 20-50V to 12V). In some examples, primary module converter 150 is always activated (i.e., available to provide power output as soon as it is connected to battery controller 116 by a switch). Alternatively, primary module converter 150 can be switched between its activated and deactivated states, e.g., by using another lower-power module converter. In either case, primary module converter 150 and/or a lower-power module converter cause a very minimal drain of battery modules 130. For example, a typical self-discharge of lithium-ion battery cells is 1-2% each month (or about 50-100 mW for a 4 kWh module). For comparison, the drain of primary module converter 150 can be less than 5 mW, and this drain rate can be further reduced by adding secondary module converter 170 (having much lower power ratings and drain than primary module converter 150 and used primarily to activate primary module converter 150).

For example, when electric vehicle 100 is turned off (e.g., the ignition switch is in the "off" position), the only powered component can be primary module converter 150 and/or a lower-power module converter and, in some instances, battery controller 116. On the other hand, when electric vehicle 100 is turned on (e.g., the ignition switch is in the "on" position), primary module converters 150 can power other components (e.g., auxiliary systems 106) together with vehicle converter 104.

The outputs of all primary module converters 150 can be connected in parallel and taken out of high-voltage battery pack 120 to power battery controller 116 and high-voltage contactors 114. With that, low-voltage area 119 is always isolated from constant high-voltage area 117 while the components in low-voltage area 119 can be always powered, regardless of the state of high-voltage contactors 114. This approach eliminates the need for low-voltage battery 109 (shown in FIG. 1A) and avoids the problems associated with battery-pack converter 124 (shown in FIG. 1B).

Examples of Electric-Vehicle Battery Systems

Figure 2A:
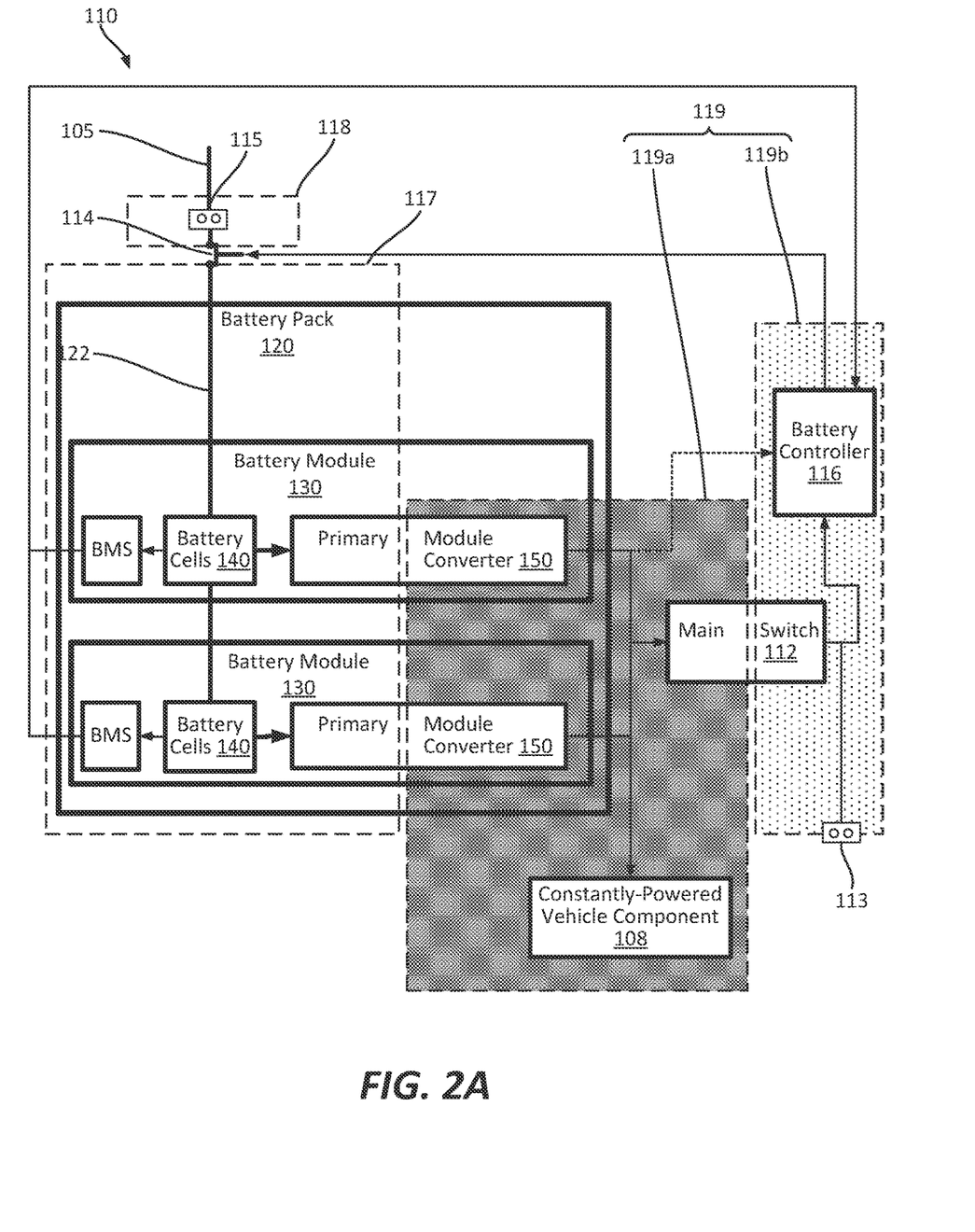
FIG. 2A is a block diagram of an electric-vehicle battery system power comprising multiple battery modules, each comprising a primary module converter, used for powering high-voltage contactors of the battery based on the main switch position, in accordance with some examples.
Figure 2B:
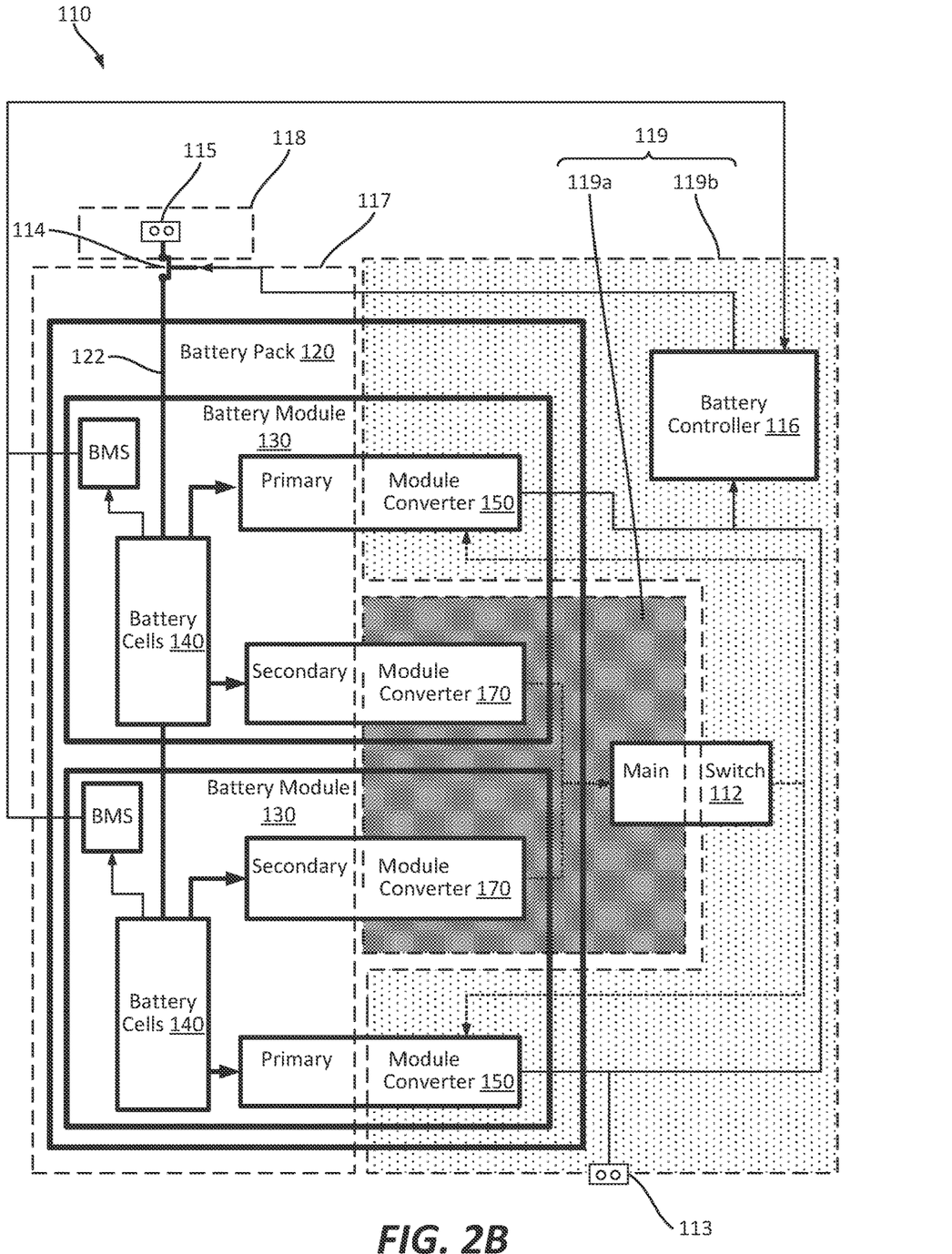
FIG. 2B is a block diagram of an electric-vehicle battery system power comprising multiple battery modules, each comprising a primary module converter and a secondary module converter, such that the secondary module converter is used to activate the primary module converter while the primary module converter is used to activate high-voltage contactors, in accordance with some examples.

FIGS. 2A and 2B are block diagrams of two examples of electric-vehicle battery system 110. In both examples, electric-vehicle battery system 110 comprises high-voltage battery pack 120, main switch 112, high-voltage contactors 114, high-voltage system connector 115, and battery controller 116. In some examples, main switch 112, high-voltage contactors 114, and/or battery controller 116 can be a part of high-voltage battery pack 120. These components of electric-vehicle battery system 110 will now be described in more detail. One having ordinary skill in the art would appreciate that electric-vehicle battery system 110 may include other components not shown in FIGS. 2A and 2B.

High-voltage battery pack 120 comprises battery-pack buses 122 and battery modules 130 interconnected by battery-pack buses 122. As noted above, battery-pack buses 122 should be distinguished from high-voltage DC bus 105, which is connected to high-voltage system connector 115 of electric-vehicle battery system 110. In other words, high-voltage DC bus 105 is not a part of electric-vehicle battery system 110 and is selectively isolated from battery-pack buses 122 by high-voltage contactors 114.

In some examples, at least some of battery modules 130 can be interconnected in series, e.g., to increase the voltage of high-voltage battery pack 120 relative to battery modules 130. For example, high-voltage battery pack 120 may have an operating voltage of at least 200V, at least 300V, at least 400V, or even at least 800V, e.g., between 350-800V. A higher voltage helps to reduce the cross-section of various conductors (e.g., battery-pack buses 122) in high-voltage battery pack 120 or, more generally, electric-vehicle battery system 110 while providing the same power levels. On the other hand, a higher voltage presents various safety concerns, described above with reference to FIGS. 1A-1C.

In the same or other examples, each battery module 130 has an operating voltage of less than 100V, less than 80V, such as 20-60V. For example, each of battery modules 130 comprises battery cells 140, some of which can be interconnected in series to increase the operating voltage of battery modules 130 relative to battery cells 140. The voltage of battery cells 140 depends on the cell chemistry (e.g., between 3.7-4.2V for lithium-ion batteries). Increasing the voltage of battery modules 130 (relative to battery cells 140) allows to reduce the cross-section of various conductors (e.g., battery module buses) in battery modules 130 while providing the same power levels. However, the number of battery cells 140 in each battery module 130 (as well as other considerations) may be insufficient to bring the battery module voltage to the level of high-voltage battery pack 120. However, even the battery module voltage can be too high for use in various parts of electric vehicle 100 and operating of various vehicle components (e.g., typically operated at 12V). As such, voltage reduction is needed and is provided by primary module converters 150.

Referring to FIGS. 2A and 2B, each battery module 130 comprises primary module converter 150 constantly connected to battery cells 140. In some examples, primary module converter 150 has an output voltage of 10-15V. In general, this output voltage is set by the requirements in low-voltage area 119. Furthermore, the total power output of all (or at least some) primary module converters 150 (one in each battery module 130) can be sufficient to operate high-voltage contactors 114. In some examples, the power output of each primary module converter 150 is less than 50 W, less than 30 W, or even less than 20 W, e.g., 5-50 W, or 10-30 W. The total power output of all primary module converter 150 (e.g., interconnected in parallel) can be at least 10 W, at least 20 W, or at least 50 W, such as between 10-500 W or, more specifically, between 50-200 W. For example, the power required to activate/close high-voltage contactors 114 can be 10-50 W or, more specifically, 30 W-40 W, while the power required to keep high-voltage contactors 114 in the activated/closed state can be between 1-10 W such as between 3-7 W. It should be noted that the power from all primary module converters 150 can be combined to operate battery controller 116 and to operate high-voltage contactors 114.

Main switch 112 can be a vehicle ignition switch or controllably connected to the ignition switch (e.g., the position of the ignition switch determined the position of main switch 112). Main switch 112 can be connected to primary module converter 150 of each of battery modules 130 and configured to switch between an activated position and a deactivated position. This position determines whether high-voltage contactors 114 are activated/closed, e.g., high-voltage battery pack 120 can be used to power electric vehicle 100, or deactivated/open, e.g., high-voltage battery pack 120 can not be used to power electric vehicle 100. Specifically, high-voltage contactors 114 are connected to battery-pack buses 122 and, in some examples, to high-voltage system connector 115. High-voltage system connector 115 is used by other components of electric vehicle 100 to connect to electric-vehicle battery system 110 (e.g., using high-voltage DC bus 105). When high-voltage contactors 114 are activated, high-voltage system connector 115 is connected to battery-pack buses 122 (and at the same voltage as battery-pack buses 122).

In some examples, electric-vehicle battery system 110 also comprises battery controller 116, which is connected to each of high-voltage contactors 114 and also connected to primary module converter 150 of each of battery modules 130. These connections can be power connections and/or communication connections. Battery controller 116 is configured to connect each of high-voltage contactors 114 when main switch 112 is in the activated position and the power is received (at battery controller 116) from primary module converter 150 of each of battery modules 130. Battery controller 116 is also configured to disconnect each of high-voltage contactors 114 when main switch 112 is in the deactivated position and the power is not received (at battery controller 116) from primary module converter 150 of each of battery modules 130. For example, each battery module 130 can be equipped with a battery management system (BMS), schematically shown in FIGS. 2A and 2B. For example, battery controller 116 may receive input from each BMS, indicating the state of charge (SOC) and/or other conditions associated with battery modules 130 before activating/closing high-voltage contactors 114. In other words, battery controller 116 may complete one or more operations (after receiving the activation signal from main switch 112) before activating/closing high-voltage contactors 114. Battery controller 116 is powered during these operations by primary module converters 150. Furthermore, some of this power is used by battery controller 116 to activate/close high-voltage contactors 114 (when this activation operation is determined by battery controller 116).

In some examples, battery controller 116 can check the isolation voltage and/or isolation resistance before closing/activating high-voltage contactors 114. For example, battery controller 116 can comprise memory and processor, such that the memory stores various control instructions for closing/activating high-voltage contactors 114 based on various input (e.g., one of which comes from main switch 112).

Referring to FIG. 2A, in some examples, main switch 112 is further connected to battery controller 116 and is configured to control the current flow between primary module converter 150 of each of battery modules 130 and battery controller 116, e.g., at least during the activation of battery controller 116. Once activated, battery controller 116 can draw power directly from primary module converters 150 (illustrated by the direct connection line between primary module converters 150 and battery controller 116 in FIG. 2A). In other words, main switch 112 can control the activation current to battery controller 116 thereby controlling the activation state of battery controller 116 (and the ability of battery controller 116 to draw to draw the operating current from primary module converters 150). Alternatively, main switch 112 can control the flow of both the activation current and the operation current from primary module converters 150 to battery controller 116. In other words, main switch 112 is positioned on the current path between all primary module converters 150 and battery controller 116. The output of all primary module converters 150 can be interconnected at or before main switch 112. In these examples, the current rating of battery controller 116 can be at least 10 Amps or, more specifically, at least 20 Amps, or even at least 30 Amps, e.g., between 10 Amps and 100 Amps or, more specifically, between 20 Amps and 80 Amps. It should be noted that the power is transmitted through main switch 112 (from all primary module converters 150 and battery controller 116) to activate high-voltage contactors 114 (using battery controller 116).

Referring to FIG. 2A, in some examples, primary module converter 150 of each of battery modules 130 is constantly activated and powered by battery cells 140 of that battery module 130. It should be noted that the constant activation of primary module converter 150 corresponds to some drain (e.g., caused by the quiescent current), which may be between 0.5 mW and 20 mW or, more specifically, between 2 mW and 10 mW (e.g., less than 10 mW or even less than 5 mW). This drain current is present even when the power output of primary module converter 150 (e.g., the power supplied to battery controller 116) is zero. It should be noted that additional power losses are experienced when the power is supplied to battery controller 116. These losses can be proportional to the supplied power and may depend on the voltage conversion ratio of primary module converter 150 (and should be distinguished from the drain that is constantly present). Overall, the drain and any power-conversion should be minimized due to the discharge of battery cells 140 in that battery module 130.

In some examples, primary module converter 150 of each of battery modules 130 can be used for charge balancing of this module relative to other battery modules 130 in the same high-voltage battery pack 120. For example, the BMS of each battery module 130 can provide the SOC information to battery controller 116, which can then determine which ones of battery modules 130 can be used to power battery controller 116 during the activation of high-voltage contactors 114. For example, one or more battery modules 130 with the lowest SOC may not be used for this operation. In some examples, battery controller 116 can be equipped with a specific power drain device (e.g., a resistor with heat dissipation capabilities) to assist with the module-level charge balancing. It should be noted that this charge balancing (by battery controller 116 before activating high-voltage contactors 114) can be performed in addition to the balancing performed by the BMS of each battery module 130.

Referring to FIG. 2A, it should be noted that primary module converter 150 of each of battery modules 130 separates electric-vehicle battery system 110 into constant high-voltage area 117 and low-voltage area 119, by stepping down the voltage of each battery module 130 to that used by low-voltage components, such as battery controller 116 and high-voltage contactors 114. Main switch 112 separates low-voltage area 119 into constant low-voltage area 119*a* and controllable low-voltage area 119*b*. Battery controller 116 is a part of controllable low-voltage area 119*b* and is only powered up when main switch 112 is activated. This approach reduces the power losses in electric-vehicle battery system 110 by positioning various components in low-voltage area controllable low-voltage area 119*b*.

In some examples, the power from primary module converters 150 can be also used to power one or more vehicle components/systems that require constant power (e.g., clocks, communication systems, security systems, etc.). Such vehicle components/systems are schematically shown in FIG. 2A as constantly-powered vehicle component 108, which is a part constant low-voltage area 119*a*.

In some examples, low-voltage connector 113 can be a part of controllable low-voltage area 119*b* and is connected to main switch 112 (similarly to battery controller 116). Low-voltage connector 113 can be used to power various components of electric vehicle 100 (e.g., using power supplied from primary module converters 150). However, unlike constantly-powered vehicle component 108, the power to low-voltage connector 113 is only supplied when main switch 112 is in the activated position (i.e., when the power is available to controllable low-voltage area 119*b*). It should be also noted that controllable low-voltage area 119*b* can also be powered from vehicle converter 104 once high-voltage contactors 114 are activated/closed (at which point primary module converters 150 can be deactivated or used in conjunction with vehicle converter 104, e.g., for charge balancing of battery modules 130).

Referring to FIG. 2B, in some examples, each of battery modules 130 further comprises secondary module converter 170 constantly connected to battery cells 140 and further connected to main switch 112. Main switch 112 is configured to control the flow of the activation current from secondary module converter 170 to primary module converter 150 (and used to activate primary module converter 150). Specifically, this activation current can be less than 20 mW, less than 10 mW, or even less than 5 mW (e.g., between 1 mW and 20 mW, between 1 mW and 10 mW, or even between 3 mW and 6 mW). Notably, this converter activation current is substantially less than the current supplied by primary module converter 150 (once activated) for other operations. In other words, the current supplied by secondary module converter 170 is much lower than that of primary module converter 150, and the current supplied by secondary module converter 170 is used primarily (or even exclusively for the activation of primary module converter 150). As a result of this power output of secondary module converter 170, the drain (e.g., caused by the quiescent current) can be less than 1 mW, less than 0.5 mW, or even less than 0.1 mW (thereby causing a substantially lower discharge of battery cells 140 in comparison to the example in FIG. 2A).

Furthermore, primary module converter 150 of each of battery modules 130 is constantly connected to battery controller 116. It should be noted that in this example, main switch 112 is connected to battery controller 116 (at least not directly). Instead, main switch 112 controls the activation of primary module converters 150, which in turn power battery controller 116.

Secondary module converter 170 of each of battery modules 130 is constantly activated and powered by battery cells 140 of a corresponding one of battery modules 130. However, each primary module converter 150 is selectively activated based on the position of main switch 112. Specifically, primary module converter 150 of each of battery modules 130 is selectively activated and powered by battery cells 140 of the corresponding one of battery modules 130 when main switch 112 is in the activated position. On the other hand, primary module converter 150 of each of battery modules 130 is selectively deactivated and not powered by battery cells 140 of corresponding one of battery modules 130 when main switch 112 is in the deactivated position.

In other words, the power from secondary module converters 170 is used for activating the corresponding ones of primary module converters 150. Once activated, the power from primary module converters 150 is used to power battery controller 116 and activate high-voltage contactors 114. As a result, the power rating of secondary module converters 170 can be substantially lower than primary module converters 150, e.g., at least 10 times lower or even at least 100 times lower. This two-converter design and the difference in power can be used to reduce the power losses within each battery module 130, which causes the discharge of battery cells 140 in each battery module 130. As noted above, the converter power losses depend on the converter power ratings, and reducing these power ratings reduces the losses.

Figure 3:
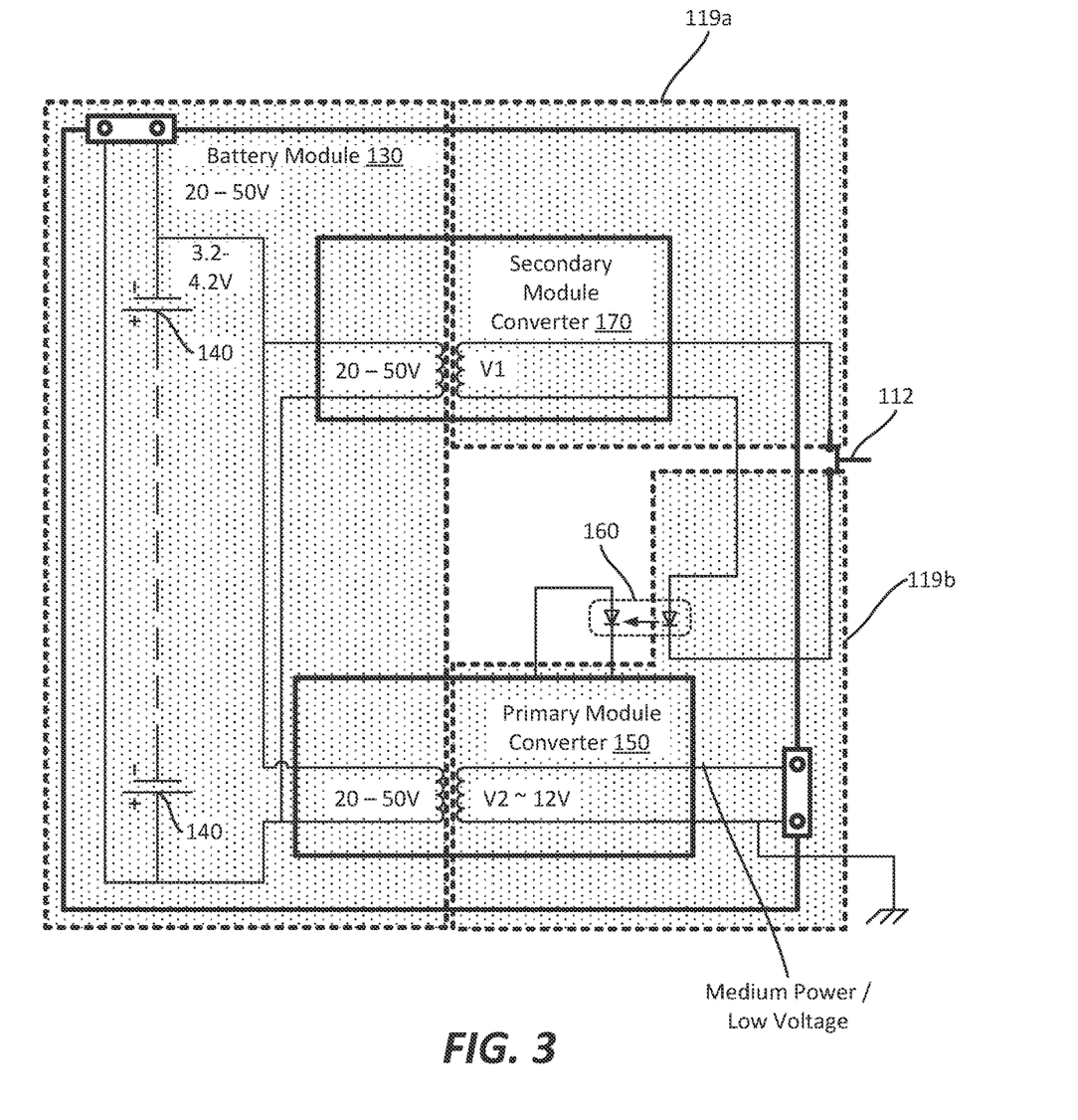
FIG. 3 is a schematic electric/block diagram of a battery module of the electric-vehicle battery system in FIG. 2B, in accordance with some examples.

Referring to FIG. 3, in some examples, each battery module 130 further comprises module switch 160, which can be connected to main switch 112, primary module converter 150, and secondary module converter 170 of this battery module 130. Module switch 160 is configured to selectively activate and power primary module converter 150 main switch 112 is in the activated position. Module switch 160 is also configured selectively deactivate and depower primary module converter 150 main switch 112 is in the deactivated position. Module switch 160 allows separating/decoupling the power from secondary module converter 170 of this battery module 130 from the power produced by other secondary module converters 170 in other battery modules 130. In other words, main switch 112 is used to control the state of each module switch 160, while module switch 160 controls the power from secondary module converter 170 to primary module converter 150. In some examples, module switch 160 of each battery module 130 is an optoisolator.

In some examples, secondary module converter 170 of each of battery modules 130 is connected in parallel to secondary module converter 170 of any other one of battery modules 130. In other words, all secondary module converters 170 are interconnected in parallel, e.g., as shown in FIG. 2B. In this example, the combined power from all secondary module converters 170 can be used for the activation of each primary module converter 150 (e.g., one at the time), thereby reducing the power output requirements from each secondary module converter 170. This example may be referred to as a many-to-one activation approach (e.g., an implemented in some form of a daisy-chain approach). In another example, the combined power from all secondary module converters 170 can be used for the activation of any number of primary module converters 150 (e.g., all primary module converters 150) and may be referred to as a many-to-many activation approach. In yet another example, main switch 112 may represent (or control) several separate switches, each controlling the connection between secondary module converter 170 and primary module converter 150 in one battery module 130. In other words, the power outputs from secondary module converters 170 are not combined but used individually/independently to activate corresponding primary module converter 150. This example may be referred to as a one-to-one activation approach.

In some examples, secondary module converter 170 has a conversion ratio equal to that of primary module converter 150. In other words, the voltage output of secondary module converter 170 is the same as the voltage output of primary module converter 150, e.g., between 10-15V. In these examples, the output of primary module converter 150 is connected to the output of secondary module converter 170. The output operating voltage of primary module converter 150 is substantially similar to the output operating voltage of secondary module converter 170.

Alternatively, secondary module converter 170 has a conversion ratio different than that of primary module converter 150. In other words, the voltage output of secondary module converter 170 is different than the voltage output of primary module converter 150. For example, secondary module converter 170 can be specifically selected based on the power requirements of module switch 160 (used for the activation of primary module converter 150), e.g., the voltage output of secondary module converter 170 can be lower than the voltage output of primary module converter 150 (e.g., 1.5V vs. 12V). In some examples, the voltage output of secondary module converter 170 is less than 12V, less than 6V, or even less than 3V (e.g., between 0.5V and 6V or even between 1V and 3V). For example, the power drawn by module switch 160 (e.g., an opto-isolator) can be less than mW or even less than 5 mW (corresponding to the current of less than 10 mA or less than 5 mA)

Vehicle Operating Examples

Figure 4:
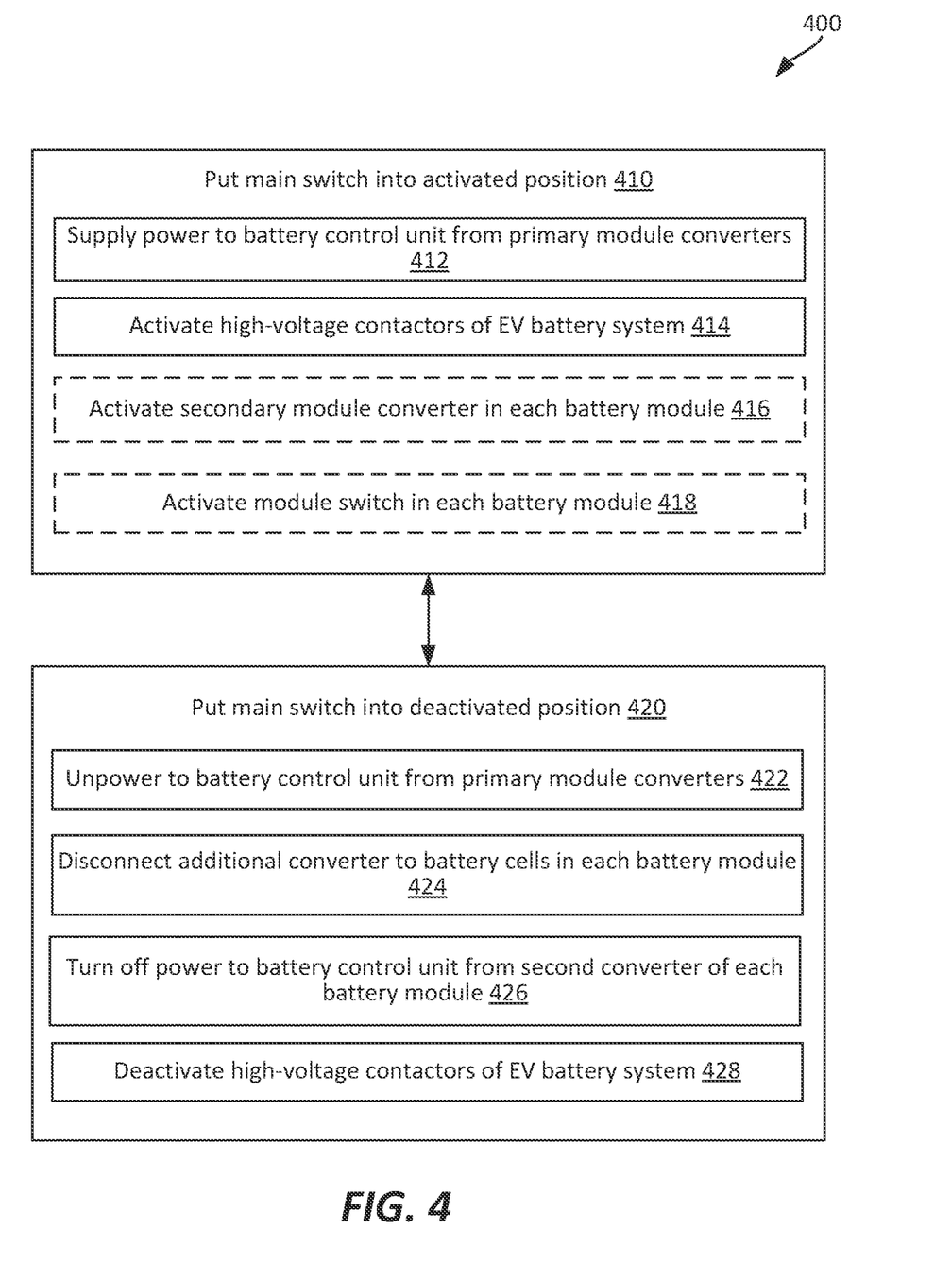
FIG. 4 is a process flow diagram corresponding to a method of operating an electric vehicle comprising an electric-vehicle battery system, in which each battery module comprises at least a primary module converter, in accordance with some examples.

FIG. 4 is a process flow diagram corresponding to method 400 of operating electric vehicle 100, in accordance with some examples. Various examples of electric vehicle 100 and its components (e.g., electric-vehicle battery system 110) are described above.

Method 400 comprises (block 410) putting main switch 112 into the activated position. In other words, main switch 112 is activated (e.g., an ignition switch is turned on), which results in (block 412) the power being supplied to battery controller 116 and (block 414) battery controller 116 activating high-voltage contactors 114 of electric-vehicle battery system 110. Depending on the configuration of electric-vehicle battery system 110 other operations are possible as will now be described with reference to FIGS. 2A, 2B, and 3.

Specifically, FIG. 2A illustrates an example where main switch 112 can be directly connected to each primary module converter 150 and battery controller 116 and control the power transmission from all primary module converters 150 to battery controller 116 (at least for the activation of battery controller 116). In this configuration, each primary module converter 150 is activated at all times. When main switch 112 is activated, battery controller 116 is activated and powered and can activate high-voltage contactors 114 (e.g., in some examples, accounting for other inputs to battery controller 116 such as various inputs from the BMS of each battery module 130 as described above). Once high-voltage contactors 114 are activated, high-voltage system connector 115 are at high voltage and the high-voltage power can be drawn to other components of electric vehicle 100, connected to high-voltage system connector 115. No other operations are needed besides blocks 412 and 414 (described above).

FIGS. 2B and 3 illustrates an example where main switch 112 controls the activation of all primary module converters 150, which remain deactivated before main switch 112 is put into the activated position. Once main switch 112 is activated, the power is supplied from each secondary module converter 170 (e.g., through main switch 112) to the corresponding primary module converter 150 for their activation (block 416). When each battery module 130 is equipped with module switch 160, method 400 also comprises (block 418) activating the module switch 160 (using the power from secondary module converters 170 and input from main switch 112, e.g., as shown and described above with reference to FIG. 3), which in turn activated primary module converter 150. More specifically, module switch 160 is used for powered by secondary module converter 170 (through main switch 112) and activates the corresponding primary module converter 150. Once primary module converter 150 is activated, the power is supplied to battery controller 116, which is activated and goes through a process of determining whether high-voltage contactors 114 should be activated. Once this determination process is completed, battery controller 116 activates/closed high-voltage contactors 114, and high-voltage battery pack 120 can supply power to high-voltage DC bus 105 of electric vehicle 100.

Method 400 comprises (block 420) putting main switch 112 into the deactivated position. The process is reversed to that described above with reference to block 410. The deactivation of main switch 112 results in (block 422) the power not being supplied to battery controller 116 and (block 424) battery controller 116 can not continue to maintain high-voltage contactors 114 in the activated/closed state. As noted above, high-voltage contactors 114 require a certain minimal power to stay activated/closed. When this power is no longer supplied to high-voltage contactors 114, high-voltage contactors 114 automatically deactivate/open. Depending on the configuration of electric-vehicle battery system 110, other operations are possible as will now be described with reference to FIGS. 2A, 2B, and 3. Furthermore, many of these operations are inverse of the operations described above with reference to block 410 and its various sub-blocks.

Specifically, in the example of FIG. 2A, when main switch 112 is deactivated, battery controller 116 is unpowered and can no longer maintain high-voltage contactors 114 in the activated state. Once high-voltage contactors 114 are deactivated, high-voltage system connector 115 is no longer at high voltage, which is needed for safety reasons. No other operations are needed besides blocks 422 and 424 (described above).

FIGS. 2B and 3 illustrates an example where main switch 112 controls the activation of all primary module converters 150. Once main switch 112 is deactivated, the power is no longer supplied from secondary module converters 170 to primary module converters 150 for their activation (block 426) and primary module converters 150 are deactivated. When each battery module 130 is equipped with module switch 160, method 400 also comprises (block 428) deactivating of module switch 160 (by losing the power from secondary module converters 170 and the deactivation of main switch 112).

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present examples are to be considered illustrative and not restrictive.

The invention claimed is:

1. An electric-vehicle battery system comprising:
   a high-voltage battery pack comprising bus bars and multiple battery modules interconnected by the bus bars, wherein each of the multiple battery modules comprises battery cells and a primary module converter constantly connected to the battery cells;
   a main switch connected to the primary module converter of each of the multiple battery modules and configured to switch between an activated position and a deactivated position;
   high-voltage contactors connected to the bus bars of the high-voltage battery pack; and
   a battery controller connected to the high-voltage contactors and also connected to the primary module converter of each of the multiple battery modules and configured:
      to connect the high-voltage contactors when the main switch is in the activated position and power is received at the battery controller from the primary module converter of each of the multiple battery modules, and
      to disconnect the high-voltage contactors when the main switch is in the deactivated position and the power is not received at the battery controller from the primary module converter of each of the multiple battery modules.

2. The electric-vehicle battery system of claim 1, wherein the main switch is further connected to the battery controller and is configured to control a current flow between the primary module converter of each of the multiple battery modules and the battery controller.

3. The electric-vehicle battery system of claim 2, wherein the primary module converter of each of the multiple battery modules is constantly activated and powered by the battery cells of a corresponding one of the multiple battery modules.

4. The electric-vehicle battery system of claim 1, wherein:
   each of the multiple battery modules further comprises a secondary module converter constantly connected to the battery cells and further connected to the main switch,
   the main switch is configured to control a current flow current between the primary module converter and the secondary module converter of each of the multiple battery modules, and
   the primary module converter of each of the multiple battery modules is constantly connected to the battery controller.

5. The electric-vehicle battery system of claim 4, wherein:
   the secondary module converter of each of the multiple battery modules is constantly activated and powered by the battery cells of a corresponding one of the multiple battery modules,
   the primary module converter of each of the multiple battery modules is selectively activated and powered by the battery cells of a corresponding one of the multiple battery modules when the main switch is in the activated position, and
   the primary module converter of each of the multiple battery modules is selectively deactivated and not powered by the battery cells of the corresponding one of the multiple battery modules when the main switch is in the deactivated position.

6. The electric-vehicle battery system of claim 5, wherein each of the multiple battery modules further comprises a module switch configured to:
   selectively activate and power the primary module converter the main switch is in the activated position, and
   selectively deactivate and depower the primary module converter the main switch is in the deactivated position.

7. The electric-vehicle battery system of claim 5, wherein the module switch of each of the multiple battery modules is an optoisolator.

8. The electric-vehicle battery system of claim 4, wherein the secondary module converter has a power rating less than that of the primary module converter.

9. The electric-vehicle battery system of claim 8, wherein the secondary module converter has a power rating more than 10 times less than that of the primary module converter.

10. The electric-vehicle battery system of claim 4, wherein the secondary module converter has a conversion ratio equal to that of the primary module converter.

11. The electric-vehicle battery system of claim 4, wherein the secondary module converter has a conversion ratio different than that of the primary module converter.

12. The electric-vehicle battery system of claim 4, wherein the secondary module converter of each of the multiple battery modules is connected in parallel to the secondary module converter of any other one of the multiple battery modules.

13. The electric-vehicle battery system of claim 4, wherein:
   an output of the primary module converter is connected to an output of the secondary module converter, and an output operating voltage of the primary module converter is substantially similar to an output operating voltage of the secondary module converter.

14. The electric-vehicle battery system of claim 1, wherein:
the high-voltage battery pack has an operating voltage of at least 200V,
each of the multiple battery modules has an operating voltage of less than 100V, and
the primary module converter of each of the multiple battery modules has an output voltage of 10-15V.

15. The electric-vehicle battery system of claim 1, wherein the primary module converter of each of the multiple battery modules is connected in parallel to the primary module converter of any other one of the multiple battery modules.

16. The electric-vehicle battery system of claim 1, further comprising a low-voltage connector connected in parallel to the primary module converter of all of the multiple battery modules.

17. The electric-vehicle battery system of claim 16, wherein the low-voltage connector is connected to the primary module converter of all of the multiple battery modules by the main switch configured to control a current flow between the low-voltage connector and the primary module converter of all of the multiple battery modules.

18. The electric-vehicle battery system of claim 1, wherein the battery modules are interconnected in series within the high-voltage battery pack.

19. An electric vehicle comprising:
a high-voltage battery pack comprising bus bars and multiple battery modules interconnected by the bus bars, wherein:
each of the multiple battery modules comprises battery cells and a primary module converter constantly connected to the battery cells, and
the primary module converter separates a constant high-voltage area of the high-voltage battery pack from a low-voltage area of the electric vehicle;
a main switch connected to the primary module converter of each of the multiple battery modules and configured to switch between an activated position and a deactivated position, wherein the main switch is a part of the low-voltage area;
high-voltage contactors connected to the bus bars of the high-voltage battery pack and configured to separate or interconnect the constant high-voltage area of the high-voltage battery pack and a controllably isolated high-voltage area of the electric vehicle;
a battery controller connected to the high-voltage contactors and also connected to the primary module converter of each of the multiple battery modules and configured:
to connect the high-voltage contactors when the main switch is in the activated position and power is received at the battery controller from the primary module converter of each of the multiple battery modules, and
to disconnect the high-voltage contactors when the main switch is in the deactivated position and the power is not received at the battery controller from the primary module converter of each of the multiple battery modules;
a vehicle converter connected to the high-voltage contactors by a high-voltage DC bus and separating the controllably isolated high-voltage area from the low-voltage area;
an inverter connected to the high-voltage contactors by a high-voltage DC bus; and
an electric motor connected to the inverter by a high-voltage AC bus, wherein the inverter and the electric motor are parts of the controllably isolated high-voltage area.

20. A method of operating an electric-vehicle battery system comprising a high-voltage battery pack, a main switch, high-voltage contactors, and a battery controller, the method comprising:
putting the main switch into an activated position thereby (a) powering the battery controller from a primary module converter of each of multiple battery modules in the high-voltage battery pack and (b) connecting the high-voltage contactors using the battery controller, wherein the battery controller redistributes a portion of power, received from the primary module converter of each of the multiple battery modules to the high-voltage contactors for connecting the high-voltage contactors; and
putting the main switch into a deactivated position thereby (a) disconnecting the battery controller from the primary module converter of each of the multiple battery modules in the high-voltage battery pack and (b) disconnecting the high-voltage contactors using the battery controller by cutting power from the battery controller to to the high-voltage contactors.

\* \* \* \* \*